US008560779B2

(12) United States Patent
Castillo et al.

(10) Patent No.: US 8,560,779 B2
(45) Date of Patent: Oct. 15, 2013

(54) I/O PERFORMANCE OF DATA ANALYTIC WORKLOADS

(75) Inventors: Claris Castillo, White Plains, NY (US); Michael J. Spreitzer, Croton On Hudson, NY (US); Malgorzata Steinder, Leonic, NJ (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 13/112,864

(22) Filed: May 20, 2011

(65) Prior Publication Data

US 2012/0297145 A1 Nov. 22, 2012

(51) Int. Cl.
*G06F 12/00* (2006.01)

(52) U.S. Cl.
USPC .................. 711/138; 711/113; 711/163

(58) Field of Classification Search
USPC ........................................................ 711/138
See application file for complete search history.

(56) References Cited

U.S. PATENT DOCUMENTS

| 8,230,070 B2* | 7/2012 | Buyya et al. .................. 709/226 |
| 8,321,870 B2* | 11/2012 | Messier et al. ................ 718/102 |
| 2004/0221112 A1 | 11/2004 | Greenfield |
| 2008/0016274 A1* | 1/2008 | Wang et al. .................... 711/113 |
| 2008/0104329 A1* | 5/2008 | Gaither et al. ................. 711/138 |
| 2009/0158248 A1 | 6/2009 | Linderman et al. |
| 2009/0300404 A1 | 12/2009 | Branson et al. |
| 2010/0115046 A1 | 5/2010 | Reddy Ryreddy et al. |
| 2010/0262871 A1 | 10/2010 | William |
| 2011/0041006 A1* | 2/2011 | Fowler ............................ 714/10 |

* cited by examiner

*Primary Examiner* — Reginald Bragdon
*Assistant Examiner* — Hannah A Faye-Joyner
(74) *Attorney, Agent, or Firm* — Preston J. Young, Esq.; McGinn IP Law Group, PLLC

(57) ABSTRACT

A method and structure for processing an application program on a computer. In a memory of the computer executing the application, an in-memory cache structure is provided for normally temporarily storing data produced in the processing. An in-memory storage outside the in-memory cache structure is provided in the memory, for by-passing the in-memory cache structure for temporarily storing data under a predetermined condition. A sensor detects an amount of usage of the in-memory cache structure used to store data during the processing. When it is detected that the amount of usage exceeds the predetermined threshold, the processing is controlled so that the data produced in the processing is stored in the in-memory storage rather than in the in-memory cache structure.

20 Claims, 12 Drawing Sheets

800

I/O PERFORMANCE OF DATA ANALYTIC WORKLOADS

BACKGROUND OF THE INVENTION

1. Field of the Invention

The present invention generally relates to intermediate data handling of large scale data intensive computation. More specifically, when a memory sensor detects that a disk cache is stressed, a hybrid mode permits intermediate data to be stored directly into memory, thereby temporarily by-passing the disk cache.

2. Description of the Related Art

The rapid growth of the Internet and World Wide Web has led to vast amounts of information as available online. Additionally, businesses and government organizations create large amounts of both structured and unstructured information, all of which potentially needs to be processed, analyzed, and linked.

Data-intensive computing is a class of parallel computing applications in which large volumes of data uses a data parallel approach for processing. The data is typically terabytes or petabytes in size, often referred to as Big Data, and data intensive computing applications require large volumes of data and devote most of their processing time to I/O (input/output) and manipulation of data. In contrast, computing applications which devote most of their execution time to computational requirements are deemed compute-intensive.

Parallel processing approaches are sometimes generally classified as either compute-intensive or data-intensive. Compute-intensive application programs are compute bound, and such applications devote much of their execution time to computational requirements, as opposed to I/O, and typically require relatively small volumes of data. Data-intensive applications are I/O bound or with a need to process large volumes of data, and such applications devote much of their processing time to I/O and movement and manipulation of data. Parallel processing of data-intensive applications typically involves partitioning or subdividing data into multiple segments which can be processed independently, using the same executable application program in parallel on an appropriate computing platform, and then reassembling the results to produce the completed output data.

Current data-intensive computing platforms typically use a parallel computing approach combining multiple processors and disks in large commodity computing clusters connected using high-speed communications switches and networks which allows the data to be partitioned among the available computing resources and processed independently to achieve performance and scalability based on the amount of data. A cluster can be defined as a type of parallel and distributed system, which consists of a collection of inter-connected stand-alone computers working together as a single integrated computing resource. This approach to parallel processing is sometimes referred to as a "shared nothing" approach since each node, consisting of a processor, local memory, and disk resources, shares nothing with other nodes in the cluster.

A variety of system architectures have been developed for data-intensive computing, including the MapReduce architecture pioneered by Google, now available in an open-source implementation called Hadoop used by Yahoo, Facebook, and others. The MapReduce architecture and programming model allows programmers to use a functional programming style to create a map function that processes a key-value pair associated with the input data to generate a set of intermediate key-value pairs, and a reduce function that merges all intermediate values associated with the same intermediate key. The system automatically handles details like partitioning the input data, scheduling and executing tasks across a processing cluster, and managing the communications between nodes, so programmers can easily use a large distributed processing environment even without having experience in parallel programming.

FIG. 1 exemplarily shows a programming model 100 for the MapReduce architecture where a set of input key-value pairs associated with the input data is received 101 and a set of output key-value pairs 108 is ultimately produced. In the Map phase 102-105, the input data 101 is partitioned into input splits and assigned 103 to Map tasks associated with processing nodes in the cluster. The Map task 104 typically executes on the same node containing its assigned partition of data in the cluster. These Map tasks perform user-specified computations on each input key-value pair from the partition of input data assigned to the task, and generates a set of intermediate results 105 for each key.

The shuffle and sort phase 106, 107 then takes the intermediate data generated by each Map task, sorts this data with intermediate data from other nodes, divides this data into regions to be processed by the reduce tasks, and distributes this data 106 as needed to nodes where the Reduce tasks will execute. The Reduce tasks 107 perform additional user-specified operations on the intermediate data, possibly merging values associated with a key to a smaller set of values, to produce the output data 108. For more complex data processing procedures, multiple MapReduce calls may be linked together in sequence.

Hadoop is an open source software project sponsored by The Apache Software Foundation, which implements the MapReduce architecture, and is fundamentally similar to the Google implementation except that the base programming language for Hadoop is Java instead of C++. Hadoop includes a distributed file system called HDFS, analogous to the GFS used in Google's MapReduce. The Hadoop implementation is intended to execute on clusters of commodity processors.

The present inventors have been investigating architecture commonly used for data-intensive applications that involve large amounts of data and are I/O bound, whether or not executed on a parallel platform, and have discovered a problem that is addressed by the concepts of the present invention.

More particularly, the present invention has resulted on testing and measurements on the intermediate data handling involving a disk cache, a transparent buffer of disk-backed file pages kept in a main memory (RAM) by the operating system for quicker access.

Following experiments that are further discussed below, the present inventors discovered that management of intermediate data, including the size of the disk cache, can play an important role in determining performance. These experiments have uncovered that there is a need for improving efficiency of intermediate data handling in large scale data intensive computations, and the present invention provides one solution to reduce these problems.

As noted above, although data-intensive applications are often associated in the art with parallel-processing using a cluster of computers, the concepts of the present invention is not intended to be limited to parallel processing. Rather, these concepts are useful for any computing applications that tend to be I/O bound and/or involve large amounts of data.

SUMMARY OF THE INVENTION

In view of the foregoing, and other, exemplary problems, drawbacks, and disadvantages of the conventional systems, it is an exemplary feature of the present invention to provide a structure (and method) in which data-intensive applications can be processed more efficiently.

It is another exemplary feature of the present invention to provide a structure and method for holding intermediate in application-level memory for precisely the needed time, to improve performance when a disk cache is stressed during data-intensive application processing.

In a first exemplary aspect, described herein is an apparatus including at least one processor for executing a processing of an application program; a main memory including an in-memory cache structure for normally temporarily storing data produced in the processing and an in-memory storage structure outside the in-memory cache structure, for by-passing the in-memory cache structure for temporarily storing data under a predetermined condition; a sensor for detecting an amount of usage of the in-memory cache structure used to store data during the processing; and a controller for, upon a detection by the sensor that the amount of usage exceeds the predetermined threshold, controlling the processing so that the data produced in the processing is stored in the in-memory storage structure rather than in the in-memory cache structure.

In a second exemplary aspect, also described herein is a method of processing an application program on a computer, the method including providing, in a memory of the computer executing the application, an in-memory cache structure for normally temporarily storing data produced in the processing; providing, in the memory, an in-memory storage outside the in-memory cache structure, for by-passing the in-memory cache structure for temporarily storing data under a predetermined condition; providing a sensor for detecting an amount of usage of the in-memory cache structure used to store data during the processing; detecting that the amount of usage exceeds the predetermined threshold; and controlling the processing so that the data produced in the processing is stored in the in-memory storage rather than in the in-memory cache structure.

In a third exemplary aspect, also described herein is a non-emphemeral, machine-readable storage medium tangibly embodying a series of machine-readable instructions for causing a processor to execute a method of processing an application program on a computer, the method including providing a sensor for detecting an amount of usage of an in-memory cache structure used to store data during the processing; detecting that the amount of usage exceeds the predetermined threshold; and controlling the processing so that the data produced in the processing is stored in an in-memory storage outside the in-memory cache structure rather than in the in-memory cache structure.

In a fourth exemplary aspect, also described herein is a set of machine-readable instructions, as tangibly embodied on a machine-readable storage medium, for executing a data intensive computing application, the instructions including a sensor for detecting an amount of usage of an in-memory cache structure used to store data during a processing of the data intensive computing application; and a controller having a function that, upon a detection that the amount of usage exceeds the predetermined threshold, the processing is controlled so that the data produced in the processing is stored in an in-memory storage outside the in-memory cache structure rather than in the in-memory cache structure.

The present invention thereby provides a mechanism by which data-analytic platforms can become more efficient by isolating negative effects of an overstressed disk cache so that intermediate data can be maintained in application-level memory.

BRIEF DESCRIPTION OF THE DRAWINGS

The foregoing and other purposes, aspects and advantages will be better understood from the following detailed description of an exemplary embodiment of the invention with reference to the drawings, in which.

EXEMPLARY EMBODIMENTS OF THE INVENTION

Figure 1:
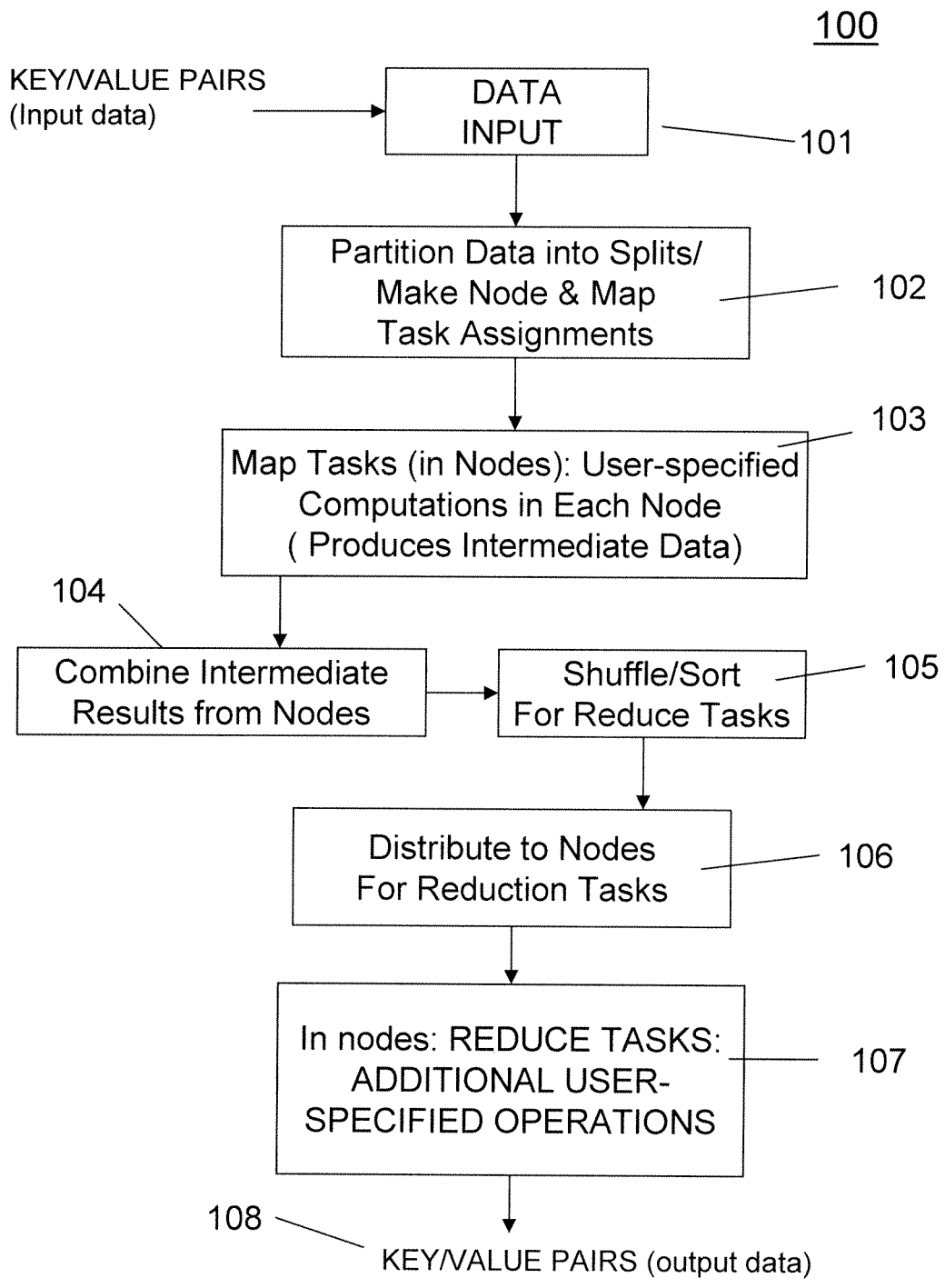
FIG. 1 provides an exemplary flowchart 100 of a programming model for the MapReduce architecture used to exemplarily implement the present invention.

Referring now to the drawings, and more particularly to FIGS. 2-12, an exemplary embodiment of the method and structures according to the present invention will now be described.

As previously mentioned in the introduction above, MapReduce is a popular paradigm for processing large data sets in a cluster of computers. Its adoption is promoted by its simplicity and the development of open source middleware such as Hadoop.

Figure 2:
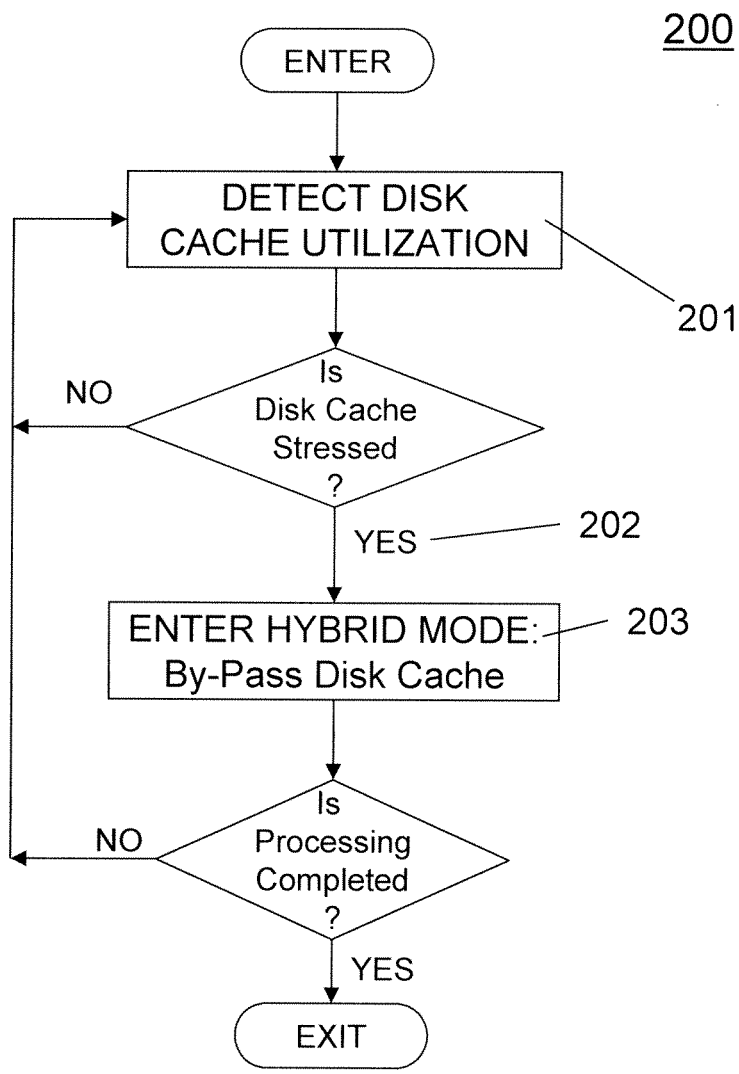
FIG. 2 shows in exemplary flowchart format 200 a summary of the method of an exemplary embodiment of the present invention.

As a preliminary summary/introduction for the following description of the present invention, FIG. 2 shows a high-level flowchart 200 of the concepts of the control loop disclosed by an exemplary embodiment of the present invention, wherein a sensor determines 201 whether the disk cache is approaching a pre-set threshold of capacity 202. If such threshold is reached, the processing enters into a hybrid mode 203 wherein memory outside the disk cache is used as a temporary addition for the disk cache normally used in the processing, using incremental size that is consistent and convenient with the underlying processing architecture. This hybrid technique has the advantage of providing a mechanism that permits the disk cache to be bypassed when necessary, without disrupting the normal processing or the normal disk cache architecture.

Turning now to a detailed background discussion of the events which ultimately led to the development of the present invention, the inventors were concerned with the performance/cost/reliability tradeoff and the manageability of MapReduce middleware that runs multiple jobs concurrently.

I/O performance is a determining factor in the performance of large scale data intensive computation. Much attention has been paid to improving I/O performance of existing MapReduce implementations.

For instance, achieving data locality is crucial to the performance of MapReduce jobs since it enables a high data rate on clusters built from commodity hardware. To address this issue, solutions based on compute and data placement strategies have been proposed by the research community. Mechanisms for optimizing disk access patterns, such as efficient encoding formats and compression, have been also adopted to improve I/O performance of MapReduce jobs in most mature MapReduce implementations.

The present invention has a focus on the intermediate data handling in MapReduce middleware and, more particularly, the role of the disk cache is considered. As mentioned briefly in the introduction, disk cache is a transparent buffer of disk-backed file pages kept in main memory (RAM, also known as Random Access Memory) by the operating system for quicker access. Together with page caching and flushing algorithms, disk cache can effectively amortize the cost of file read and write operations.

More generally, the disk cache specifically used in the exemplary embodiment discussed herein can be considered as a RAM memory device incorporating at least a portion with a cache technology that provides a cache format and a cache algorithm, such that the memory device provides the characteristics of shorter latency for access, as commonly attributed to a cache structure, for data-intensive applications.

To better understand the role of memory management in the I/O performance of MapReduce jobs, the present inventors investigated the sensitivity of Hadoop jobs to disk cache size. Their findings show that certain jobs are more sensitive to disk cache size than others, resulting in performance degradation of up to 24% when the disk cache is small for some jobs. Furthermore, this sensitivity is mostly due to file I/O for intermediate data. Storing the intermediate data on disk speeds up failure recovery but comes at a high cost if not properly managed under conditions of insufficient disk cache. A naive and expensive solution to this problem adopted in practice is to overprovision memory in MapReduce clusters.

A rule of thumb followed in the deployment of Hadoop clusters is to maintain a high RAM to processor ratio in slave machines. For example, up to 2 GB per processor has been recommended in practice for Intel-based Hadoop clusters. This approach, although effective, is inefficient and requires some attention from the users.

The present invention demonstrates that it is possible to manage the caching of Hadoop intermediate data more intelligently than is done by generic operating system policies. The investigation by the present inventors shows that the amount of memory needed to maintain the intermediate data in the map works until it is read is relatively small for the benchmarks considered.

More particularly, the present inventors were inspired by the modesty of that memory need and by the desire to enable something that has been widely recognized as valuable in other contexts: the ability to intelligently place data to give a more desirable combination of latency, efficiency, and fault tolerance.

As a first step in that direction, in an exemplary embodiment, the present invention discloses a structure and method, referred to herein as "Hannibal."

Hannibal is built on top of the Hadoop framework and adds a management layer responsible for efficiently managing intermediate data under low disk cache conditions. Hannibal introduces: (a) mechanisms to detect insufficient disk cache conditions and (b) an in-memory data grid (IMDG) as a (temporary) primary data store for intermediate data during such conditions. Hannibal can operate in hybrid mode so that intermediate data can be either persisted to disk or streamed through memory, effectively by-passing the disk when needed.

More generally, the IMDG specially used in the exemplary embodiment of the present invention can be considered as in-memory storage outside the RAM cache disk and not having the cache technology of the cache disk. In contrast to the cache disk, an In-Memory Data Grid achieves low response times for data access by keeping the information in-memory and in the application object form, and, if necessary, by sharing that information across multiple servers. In other words, applications may be able to access the information on that machine that they require without any network communication and without any data transformation step such as ORM, although, in general, there may be network communications if nodes are accessing IMDG nodes in other servers as part of a specific processing.

In this exemplary embodiment, Hannibal's novel design is realized by extending Hadoop. The usefulness of Hannibal's architecture is evaluated in a real testbed environment and its performance evaluated against multiple benchmark workloads. Results of these experiments show that Hannibal outperforms plain Hadoop by an average of 16% for our workloads under low disk cache conditions.

As mentioned above, Hadoop is an Apache open-source Java-based implementation of the MapReduce framework. Its main components are the MapReduce engine and the Hadoop File System (HDFS). HDFS is a distributed filesystem similar to the Google File System (GFS). It is designed to run on a collection of commodity machines, and is designed with fault tolerance in mind. A file is stored as a sequence of blocks, typically 64 MB in size. Each block may be replicated for fault tolerance.

As briefly explained in FIG. 1, a MapReduce job specifies a map function, which transforms a job input record into a set of key/value pairs, and a reduce function, which transforms a key and the set of all values associated with that key in the map output into a job output record. A job optionally includes a combiner function that can reduce data volume at the cost of some computation.

It is now described in more detail how data flows through the map and reduce tiers. The focus of the present invention is on the intermediate data, which is the data produced by the map function and consumed by the reduce function. It is normally handled as follows.

A map task begins in its map phase, in which the input is streamed in, parsed, and transformed by the map function into key/value pairs that are put in a buffer in the memory of the map task's process. Occasionally a batch of key/value pairs is moved from the buffer to disk, creating a pair of files called a spill. A spill holds a collection of chunks, each of which holds a sorted series of key/value pairs destined for a particular reduce task.

Once all the input has been consumed and all the output spilled to disk, the map task enters its commit phase. The task does a merge sort of all its spills, creating one grand spill holding all of that task's output. The task completes by registering the existence of this output. Later the task's tracker serves HTTP GET requests for chunks of this output on behalf of the reduce tasks. Each reduce task proceeds in three phases: it merges and sorts chunks of map output as they become available, applies the reduce function and stores the output into HDFS.

It is possible to use Hadoop for a job with no reduce tier; in this case the key/value pairs produced by the map function are written directly into HDFS (no spill files, no merge sort).

The Impact of Memory Allocation for Disk Cache in a MapReduce Framework

Figure 3:
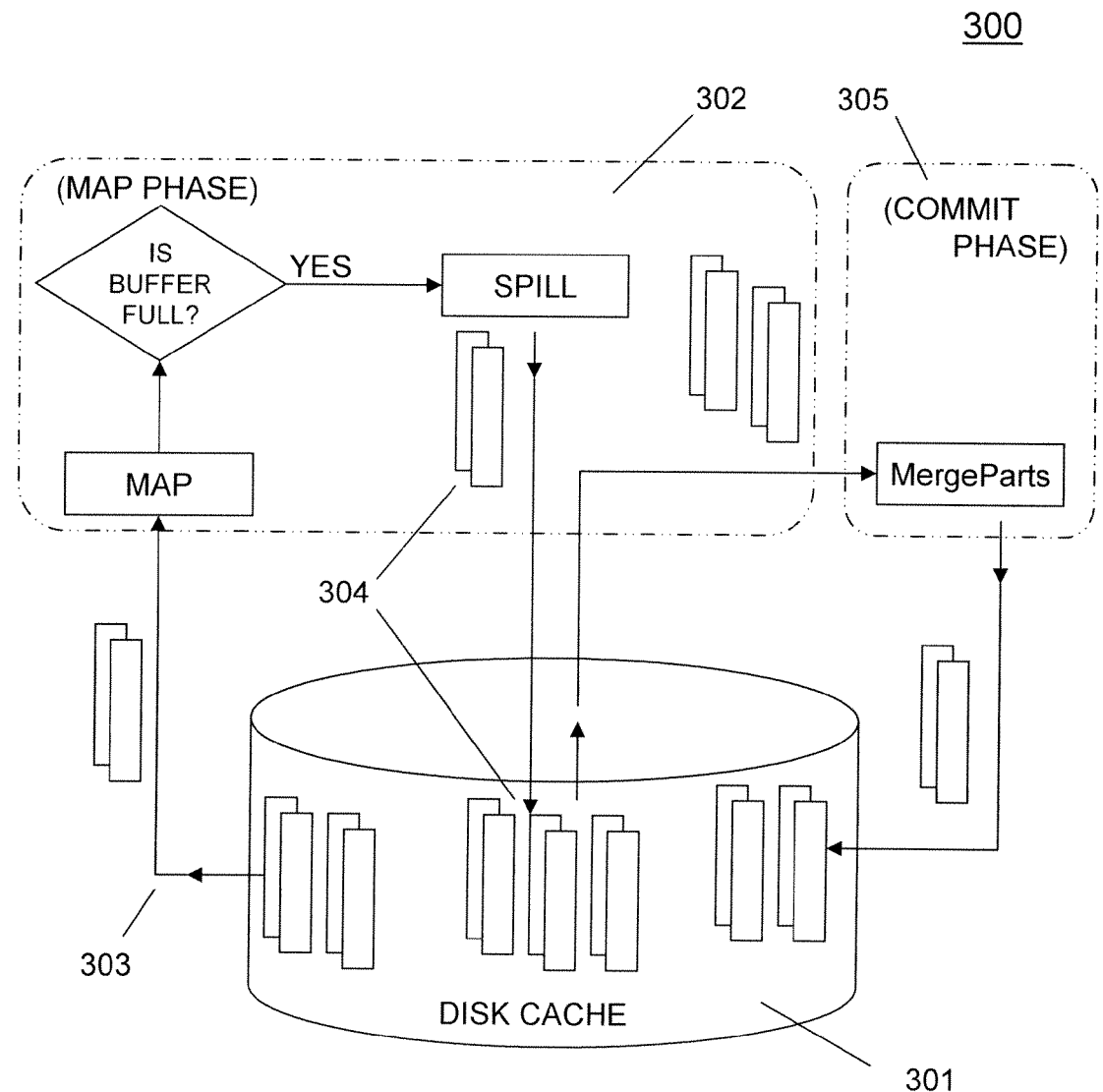
FIG. 3 shows in diagrammatic format 300 how intermediate data is managed in Hadoop MapReduce.

As exemplarily shown in FIG. 3, the disk cache 301 is involved at several different steps in the execution 300 of a MapReduce job. First, the disk cache 301 is used in the map phase 302, where input data 303 is read from HDFS, spilling intermediate data 304 to local disk.

Second, the disk cache 301 is used in the commit phase 305 when the intermediate data 304 stored in spill files is merged and returned to the disk cache 301. Third, although not shown in FIG. 3, the disk cache 301 is also used when the map-side TaskTracker serves the merged data to HTTP requests. Fourth, again not shown in FIG. 3, the disk cache 301 is also used during the reduce task when storing and merging intermediate data to local disk and writing output data to HDFS. It is the second and third steps are where the map tier can benefit the most from caching since it can eliminate disk reads.

In more detail, the performance of the map steps involving intermediate data can benefit from a well provisioned disk cache by:

(1) The cache enables batching of disk writes, making them more efficient; this applies both when writing the spills and when writing their merge;

(2) If the spill files are resident in memory by the time the map task begins its final merge, that will require no disk reads; and (3) If the merged map output is in the cache when it is requested from the TaskTracker then disk reads are not needed.

The realization of these conditions, however, depends on the ability of the disk cache and paging algorithm to retain the data in memory within a time window large enough to ensure that it can be retrieved directly from memory when needed. It is commonly assumed that these conditions are met in practice. This, however, not only depends on the size of the disk cache but also on how the data access patterns of the workloads pollute the disk cache.

To investigate these issues further, the present inventors conducted tests, of which two exemplary experiments are described and analyzed in more detail below, wherein multiple jobs with different data access patterns sharing the same Hadoop cluster were benchmarked under various memory conditions. They expected that jobs with different access patterns would stress the disk cache differently, thus exposing a broader spectrum of behavioural patterns for the study.

The Testbed

The testbed consisted of a 12-node cluster with Hadoop 0.20.2. Each node used a 64-bit PowerPC with 4 2.5 GHz cores, 8 GB of RAM and 80 GB of local disk. All nodes ran Red Hat Linux 5.3 and were connected through a 1 Gb network.

The cluster had a total capacity of 36 map task slots and 12 reduce task slots. That is, there were three map and one reduce task slots per node. The cluster used the capacity scheduler included in the contribution package, which was configured with three queues of equal share of tasks slots, i.e., each queue could utilize at most 33% of the tasks slots available in the cluster. HDFS is configured with 128 MB block size and replication factor of 1.

Workloads

Hannibal's premise that the management of data is key to the performance perceived by MapReduce jobs and the system overall. To evaluate Hannibal the inventors considered workloads that handle a reasonable amount of intermediate data. They used two benchmarks which are included in the Hadoop distribution—wordcount and grep—and tagger, an in-house benchmark.

Wordcount is a CPU-intensive job that counts word occurrences in a 27 GB text document. The amount of intermediate data produced by this benchmark depends on the input data set and the presence of a combiner. This job consisted of 200 map tasks and 12 reduce tasks.

Grep is an I/O-intensive job that extracts strings matching a specified regular expression and counts how many times they occurred in a 25 GB document. Grep has been described as "representative of a large subset of the real programs written by users of MapReduce" by the authors of the original MapReduce paper. The amount of intermediate data generated by this job depends on the input data set and the regular expression considered. This job has 250 map tasks and 12 reduce tasks.

Tagger is an I/O intensive job with very low CPU demand. This job is used to pre-process data for another MapReduce job by adding a 10-byte tag to each input record. It only has a map tier and therefore does not have intermediate data. This job consists of 1000 map tasks.

The Experiments

To evaluate the effectiveness of the disk cache in our MapReduce framework the inventors ran three jobs concurrently in the Hadoop cluster: two tagger jobs with different input data set and either a wordcount or a grep job. Each job was submitted to a different queue to guarantee an equal share of slots for each job. To capture the sensitivity of the workloads to the size of the disk cache, they ran the experiment with various disk cache sizes. They avoided the undesired effects of swapping by ensuring that all the processes fit in memory (as verified with vmstat).

Figure 4:
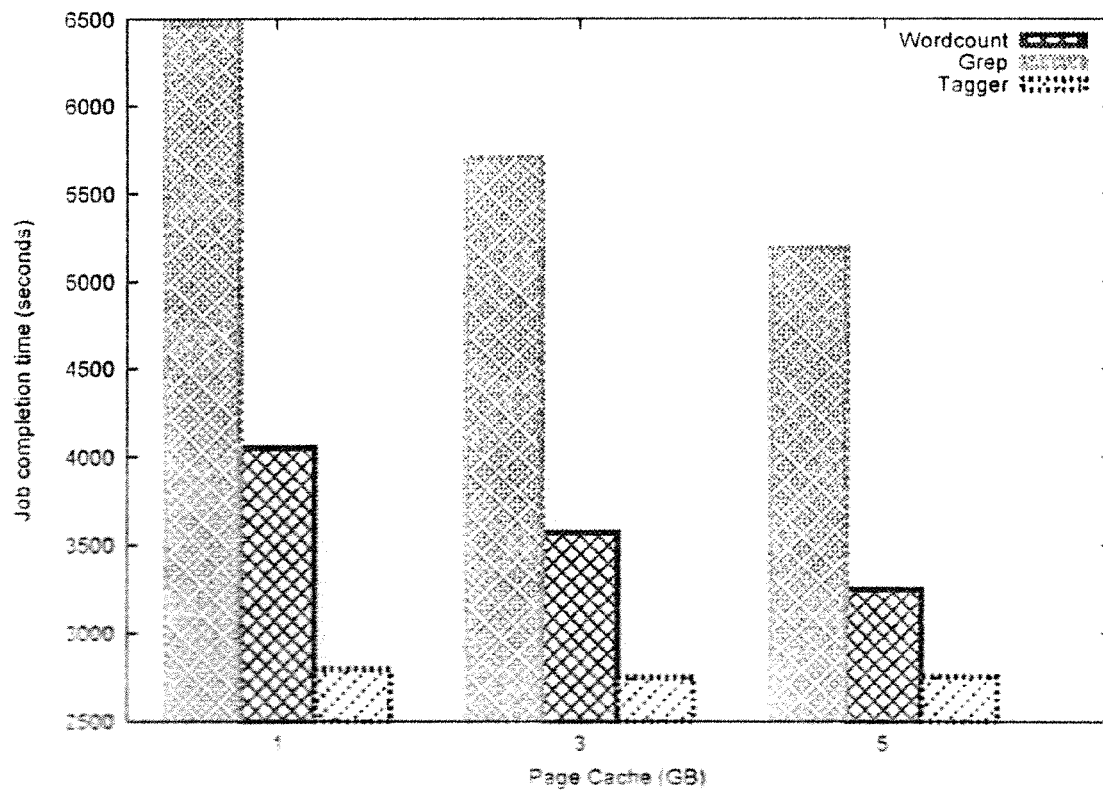
FIG. 4 shows exemplary performance degradation 400 in end-to-end performance.
Figure 5:
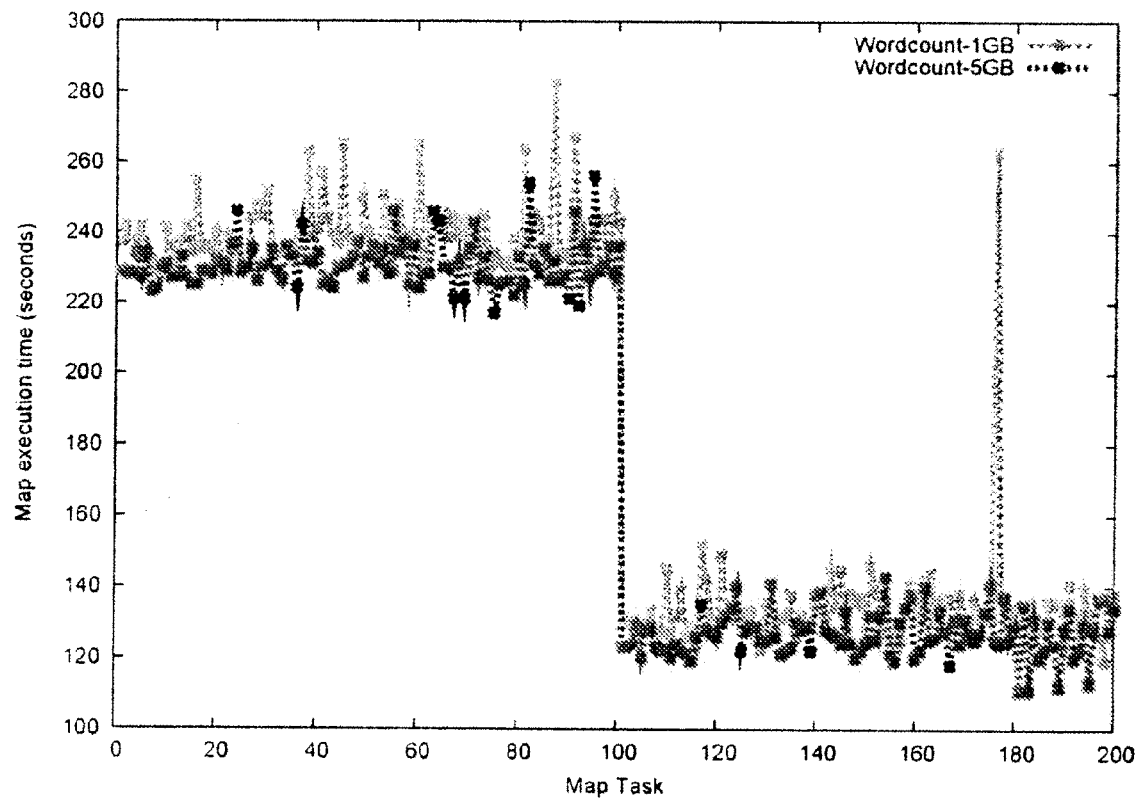
FIG. 5 shows exemplary performance degradation 500 in map tasks.

In FIG. 4 is shown exemplarily the end-to-end execution time 400 of the wordcount and grep jobs with various disk cache sizes is plotted, demonstrating the execution times of the jobs in the experiment. It is observed that for wordcount and grep, the execution time increases 24% and 17% (respectively) as the disk cache size is reduced from 5 GB to 1 GB.

To gain a better understanding of these results, Hadoop was instrumented to capture the elapsed time of different stages within a job. It was found that most of the slow down observed in the end-to-end performance of these jobs was due to an increase of 9% percent in the execution time of map tasks, as shown by the graph 500 in FIG. 5.

A more in-depth analysis of the traces reveals that the merge phase accounts for most of the observed slow down. Furthermore, wordcount generates a larger amount of intermediate data than grep and hence can benefit more from a well-provisioned disk cache. This fact explains the greater performance degradation experienced by wordcount. Note that the later map tasks are much quicker because their InputSplits are much smaller. On the other hand, the tagger job experiences less than 2% performance degradation under the same condition, despite the fact that it is the most I/O intensive job. This can be explained by the fact that this job never reads any data it previously wrote, and so the disk cache can provide only the relatively minor benefit of batching disk writes.

Discussion

From these results it was apparent to the present inventors that the size of the disk cache plays an important role in determining the performance within the MapReduce framework. To further investigate the underlying causes of this behaviour block-level statistics in the cluster were collected using systat. It was observed that the average await time per I/O request increases significantly (23%) while the service time per I/O request remains the same. Recall that the await time includes the service time and the time the requests wait in queue. Thus, an increase in the length of the queue is responsible for the performance degradation observed as the page cache size is reduced. This can be explained by the fact that as the disk cache gets smaller the flushing and paging processes flush to disk more aggressively, increasing the congestion of the block layer.

The conclusions of this experiment are multi-fold. First, the performance of MapReduce jobs is greatly influenced by the management of intermediate data. More specifically, the availability of intermediate data comes at a high cost if careful consideration is not made when managing it. Second, the access patterns of the intermediate data and how the jobs can benefit from using the disk cache should be taken into consideration when deciding on memory provisioning for MapReduce frameworks. This is in contrast to the more traditional approach wherein decisions for memory provisioning are mainly based on the memory footprint of the map and reduce processes.

To effectively implement this, however, the workloads must be characterized either offline or online. Offline profiling techniques have proven successful for workload management in multiple contexts in the past. Their effectiveness for MapReduce frameworks remain unclear due to the complex nature of the MapReduce workloads; in particular, their data distribution dependency. Developing online techniques also imposes many challenges: First, from the system perspective, detecting insufficient disk cache as a root cause of performance degradation requires low-level monitoring mechanisms whose overhead are prohibitive. In fact, to the best of the present inventors' knowledge, such a tool is not publicly available. Furthermore, conditions that are commonly considered indicative of low memory conditions in a machine, e.g., process paging, are not necessarily present under an insufficient disk cache size condition, as shown in the experiments. Furthermore, these problems are exacerbated in virtual environments due to the difficulty of obtaining an accurate view of resource usage.

The online approach of the present invention was developed to address the degradation in performance resulting from low disk cache allocation. Hannibal introduces an in-memory data grid as a (temporary) primary store for intermediate data during conditions of insufficient disk cache. Hannibal effectively by-passes the disk cache at the cost of reliability when needed. Following we describe Hannibal in detail.

Hannibal Architecture

Broadly speaking, Hannibal is motivated by the desire to intelligently place data to give a more desirable combination of latency, efficiency, and fault tolerance. The experimental work reported in a paper prepared and submitted concurrent to this application is focused on one idea: Promoting in-memory storage as temporary primary storage for intermediate data to mitigate the performance degradation resulting from the ineffectiveness of disk cache under memory constrained conditions.

More specifically, when Hannibal detects insufficient disk cache allocation in one of its worker nodes, Hannibal enters the node into a hybrid-mode. In this mode, map tasks store intermediate data into small IMDG processes (up until they overflow), thus isolating the performance of the application from the undesired effects of the limited disk cache. If and when an IMDG process holds more than a configured limit of intermediate data, any additional intermediate data for it is written to files as in plain (disk-only) mode. Both tests are made at the start of each task, not revisited during a task.

Recall that Hadoop provides for fault-tolerance by persisting intermediate data to disk. Hannibal trades fault-tolerance capabilities for performance. The cost of this trade-off however, depends on the size of the time window during which there is insufficient disk cache and the reliability requirements of the application. To understand the effect on failure recovery costs, consider what happens when a slave machine hosting a reduce tasks fails.

In plain Hadoop, the framework will detect the failing TaskTracker and assign the reduce task to a healthy TaskTracker in the cluster. The reduce task then starts fetching all the mapOutputs previously stored in the local disks of the cluster. In Hannibal, map tasks running in a node that has entered hybrid-mode do not persist all their mapOutputs to disk and therefore would have to be re-executed in order to regenerate the mapOutput in the presence of failure. Techniques such as the ones proposed in Ku, et al., "On Availability of Intermediate Data in Cloud Computations", can be used to address this trade-off with minimum overhead.

The amount of additional work that would be needed to recover from a failure in Hannibal is proportional to the amount of intermediate data not persisted to disk, i.e., generated during hybrid-mode and is determined by two factors. One is the severity and duration of the low disk cache conditions. The longer slaves remain in hybrid-mode, the larger the amount of intermediate data that is not persisted to disk. The other one is the value of HeapThreshold: a higher value enables a larger amount of intermediate data to be stored in-memory.

A. Control System

Figure 6:
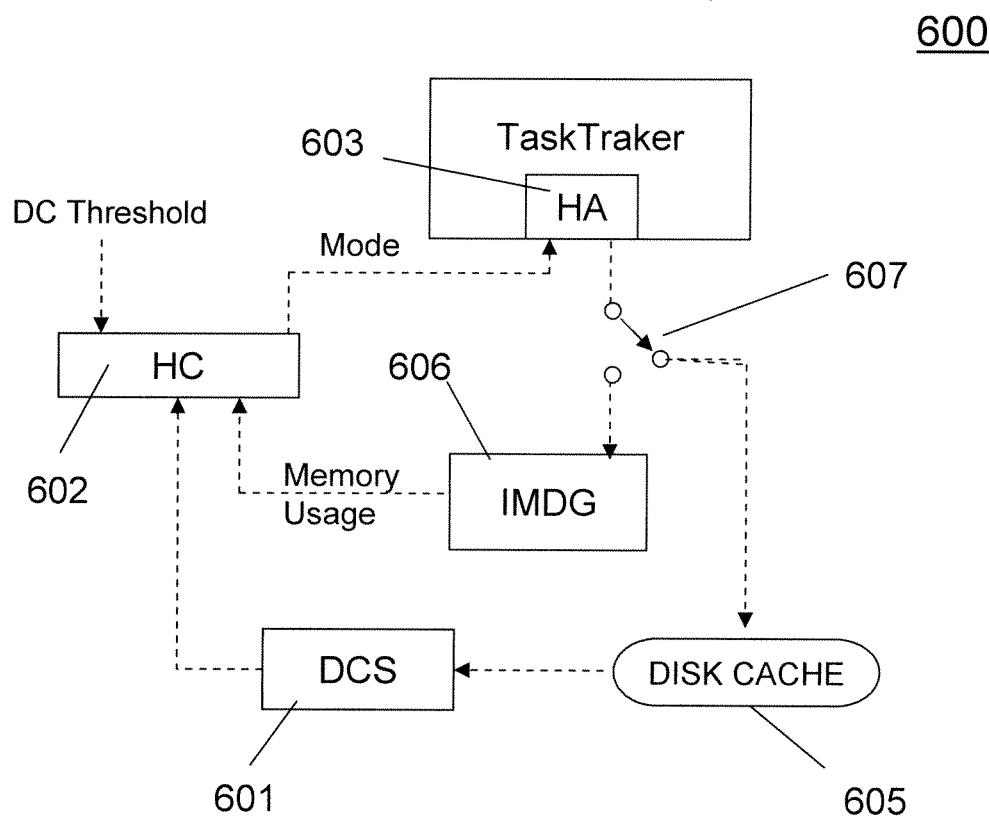
FIG. 6 shows details of an exemplary embodiment 600 of the control mechanism of the present invention.
Figure 7:
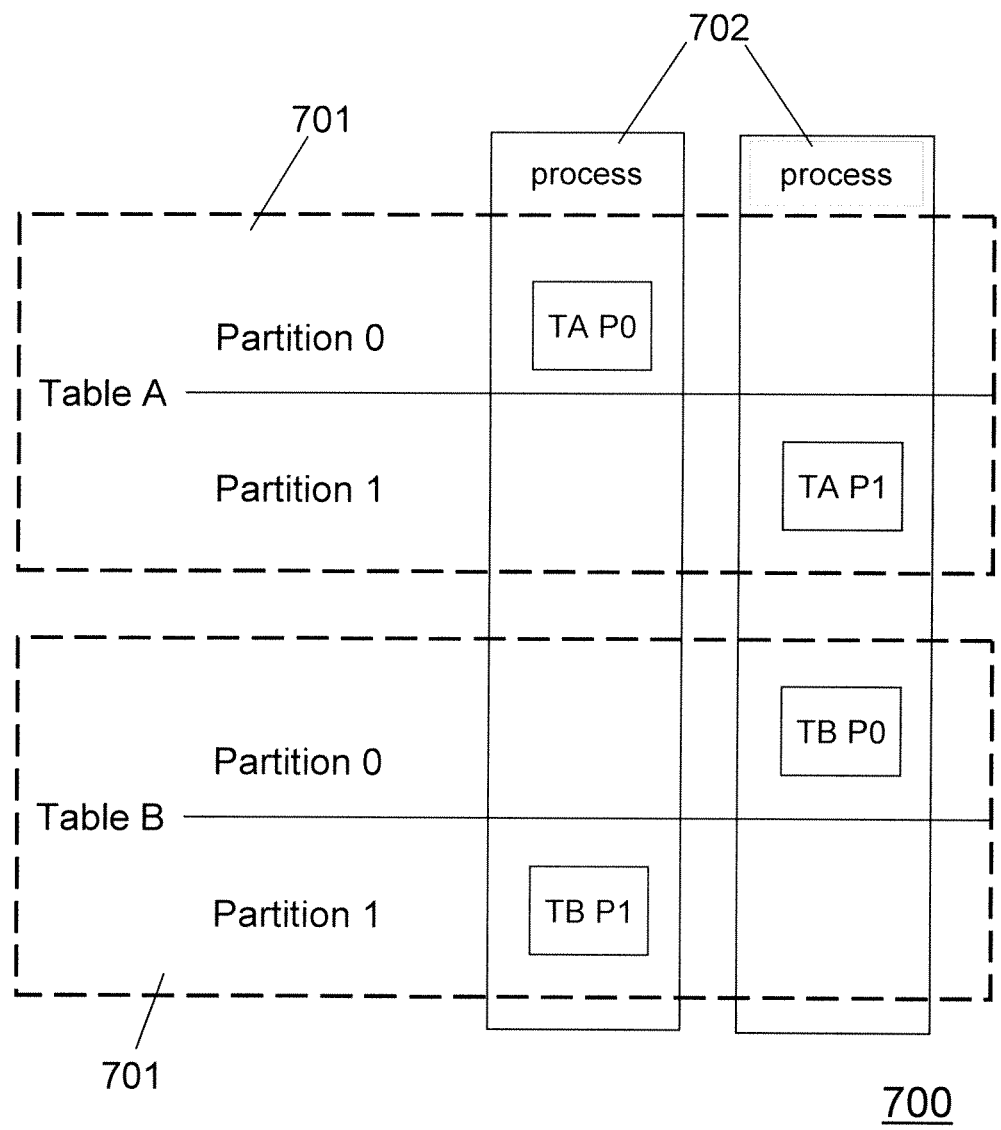
FIG. 7 shows exemplarily some IMDG concepts 700.

FIG. 6 describes in diagrammatic format 600 how Hannibal detects and reacts to insufficient disk cache allocation. It is noted that FIG. 6 shows components incorporated in each machine in the cluster involved in the I/O intensive processing. Hannibal extends plain Hadoop by adding to each worker node a feedback control loop that monitors the local disk cache size and reacts to disk cache stress at run-time. This loop consists of a set of sensors, a controller, and a set of actuators. Following we describe each component in detail.

1. Disk Cache Sensor (DCS): This component 601 monitors the available disk cache size periodically and reports to the Hannibal Controller 602 if the size is under a given threshold DCThreshold. DCThreshold is a configurable parameter that depends on various aspects of the system including operating system, computer architecture and workload. This parameter is chosen empirically.

In the exemplary embodiment, the intermediate data is stored in in-memory containers implemented in Java. Standard Java tools are used to measure the size of the heaps, and these measurements permit an effective measure of the amount of stored data.

2. Hannibal Controller (HC) 602: When the DCS reports insufficient disk cache the HC component 602 performs two tasks:

(1) It sets a maximum amount of memory Heap Threshold to be used for storing intermediate data. Later we explain how this parameter is used as a control knob to handle the overflowing of intermediate data from memory to disk.

(2) It informs the Hannibal Actuator (HA) 603 that the corresponding TaskTracker must enter into hybrid-mode. HC 602 leaves hybrid-mode whenever DCS reports disk cache allocation above DCThreshold.

3. Hannibal Actuator (HA) 603 is responsible for effectively enabling slave nodes (TaskTracker) to work in hybrid mode. A TaskTracker running in hybrid-mode sees a two-level storage hierarchy. The primary and secondary levels of this hierarchy consist of in-memory and local disk storage, respectively. In hybrid-mode, secondary storage (disk) is effectively treated as an overflow storage medium for the primary storage level. More specifically, map tasks store intermediate data in local-disk only if the amount of memory currently used to store intermediate data in memory is higher than HeapThreshold.

Data Streaming

Memory is a constrained resource and, therefore, it is imperative that its usage be optimized. With this goal in mind Hannibal has been designed to emulate a data streaming system. Memory allocated to data that has been already consumed by its corresponding reduce task, and therefore will not normally be needed in the future, is freed and made available for new intermediate data. In the following section this approach is explained in more detail.

In order to make Hannibal scalable and capable of handling resource heterogeneity, Hannibal's design is fully distributed in that each node acts locally, independently of the state of other machines in the system. Hence, it is possible to have all intermediate data in one slave machine persisted to disk while the opposite may be true in another slave machine in the cluster.

B. Storing Intermediate Data in Memory

In the exemplary embodiment described herein a controllable IMDG is used. There are several in-memory data grid products on the market today, and examples include Coherence, IBM WebSphere eXtreme Scale (XS), and Velocity. While they are not all as controllable as would be needed (details are given below), such controllability is not a big stretch.

An IMDG has the following characteristics. The function it provides is a simple key-value store, organized into tables 701, exemplarily shown in FIG. 7. The available operations are primarily: create a table, destroy a table, store a given value under a given key in a given table, and retrieve the value (if any) most recently stored under a given key in a given table. There may be batched versions of these operations. Hannibal creates and destroys tables in batches, and stores and retrieves data one IMDG key at a time. An IMDG stores the tables in a partitioned way.

A controllable IMDG gives the client control over the partitioning of a given table: the client supplies the number N of partitions and a partition function that maps a key to an integer in the range [0,N). Many IMDGs can replicate each table partition, but Hannibal does not make use of that; for each table partition there is only one copy, called a shard. A controllable IMDG gives the client control over the placement of the shards.

1) Organization of Shards:

Hannibal organizes the intermediate data into partitioned tables in a way that aligns with the machines on which that data is produced and consumed; this enables a placement that achieves data locality. The map tasks of a job j are numbered, 0 through $M^j-1$; the reduce tasks are also numbered from 0. The worker machines are also numbered from 0.

A given intermediate key/value pair is produced by some map task running on some worker u and consumed by some reduce task r. For a given job j Hannibal uses a batch of $R^j$ tables, one for each reduce task; we write for the table for reduce task r of job j. Each of those tables is divided into $W^j$ partitions, one for each worker machine. The job j intermediate data that is produced on worker machine u and consumed by reduce task r is stored in partition u of table r of the job's batch of tables. We write $T_{j,r}.P_u$ for that table partition, as demonstrated exemplarily in FIG. 7.

The above organization easily allows a placement that achieves data locality. Shard $T_{j,r}.P_u$ is placed at the worker machine u, the one that writes that shard. Because shards need to outlive the individual tasks that produce them, they are stored in separate processes 702.

2) Map-Reduce Key/Value Pairs vs. IMDG Key/Value Pairs:

There are several options for how to store intermediate MapReduce (MR) key/value pairs into the IMDG. Since the IMDG also uses a key/value data model, it is natural to consider a direct correspondence: each MR key/value pair is stored as one IMDG key/value pair.

There are two important problems with this approach. First, a MapReduce job's intermediate data can include several pairs with the same key but an IMDG table can store at most one pair with a given key. We could use extended keys in the IMDG to work around that problem. More importantly, MR key/value pairs are typically small, so storing and retrieving them individually involves a high overhead.

Driven by this observation, we opted for mimicking a block storage scheme and, instead, we aggregate intermediate $MR<k,v>^{MR}$ pairs into batches, namely Hannibal <k, v> pairs ($<k, v>^H$).

A Hannibal <k, v> pair is defined as follows. <k, $v>^H=<m\cdot s, v>$ where v consists of a byte array (Java byte[ ]) containing multiple <k, $v>^{MR}$ pairs produced by map task m and consumed by some reduce task r. A map task is identified by a base-0 integer value m that is generated by Hadoop.

Recall that a Hadoop map task can produce several spills, each of which can have a batch of key/value pairs destined for a given reduce task; for a given job, map task, and reduce task we simply assign serial numbers to those batches.

The last component (s) of the Hannibal key is that serial number. Here, the symbol • is the String concatenation function. The Hannibal key does not need to identify the job nor the reduce task because each IMDG table is specific to one reduce task of one job.

3) Memory Management:

In Hannibal, a <k, $v>^H$ pair is deleted from the IMDG as soon as it is read by the TaskTracker for delivery to a requesting reduce task. Our IMDG uses container processes based on Java. The sensor for the amount of heap used for intermediate data in a container is based on reading the amount of heap in use just after each garbage collection.

C. Extensions to Hadoop

Four main developments were needed in Hadoop's MapReduce layer to implement the exemplary embodiment described herein.

Worker Numbering The numbering of worker machines was not originally present in Hadoop. These were added in the exemplary embodiment.

Intermediate Data in Hannibal An additional Writer class was added, namely Hannibal Writer, whose function is to create <k, $v>^H$ pairs from the aggregation of <k, $v>^{MR}$ and serve as an IMDG client by storing new <k, $v>^H$ into the appropriate $T_{j,r}.P_u$. In place of Hadoop spilling intermediate <k, $v>^{MR}$ pairs to disk Hannibal instead creates and uses a Hannibal Writer. The way Hannibal keys are formed and the way IMDG tables and partitions are used and placed result in local writes for the map output. Similarly, modifications in the Reducer side were made so to enable the retrieval of Hannibal keys in the Reduce code.

Finer Grained Intermediate Data Pipelining

In Hannibal, intermediate data is written as <k, $v>^H$ pairs into their corresponding IMDG tables as each spill happens. To exploit the early availability of this data, we extended the event-driven framework of plain Hadoop by adding an additional event, namely, SpillReadyEvent. TaskTrackers hosting Map Tasks send SpillReadyEvents to the JobTracker as new $<k, v>^H$ are created and stored. A SpillReadyEvent includes j and the map task number which is then used by the Reducer to retrieve its corresponding $<k, v>^H$ pairs. In order to keep track of the spill serial numbers each Reduce Task maintains a local counter for each map task. This contrasts with the coarser pipelining of plain Hadoop, in which intermediate data becomes available at the end of its map task.

Note that one could also devise a modified map-reduce engine that would transfer the data asynchronously. Our approach, however, is aligned with the overall goal of decoupling the management of intermediate data from the map-reduce engine as much as possible.

Control-System Classes corresponding to HC, DCS and HA were added to enhance the TaskTracker. DCS was built on top of vmstat to monitor the disk cache. The TaskTracker was also extended to monitor the heap size of the IMDG processes as described previously.

Evaluation

In this section the performance of Hannibal is evaluated. Three different aspects are considered in this evaluation. First, exemplarily shown in FIG. 8, the end-to-end performance 800 of MapReduce jobs when running on Hannibal vs. plain Hadoop is considered. Second, exemplarily shown in FIG. 9, the reliability trade off 900 resulting from by-passing the disk under insufficient page cache conditions when using Hannibal. Third, some insights on the selection of the HeapThreshold is demonstrated exemplarily in FIG. 10, that show through experimentation that very little memory is needed to satisfy the residence-time requirements of MapReduce workloads for certain configurations.

A. Experimental Setup

To evaluate Hannibal we use the testbed and workloads previously presented.

Figure 8:
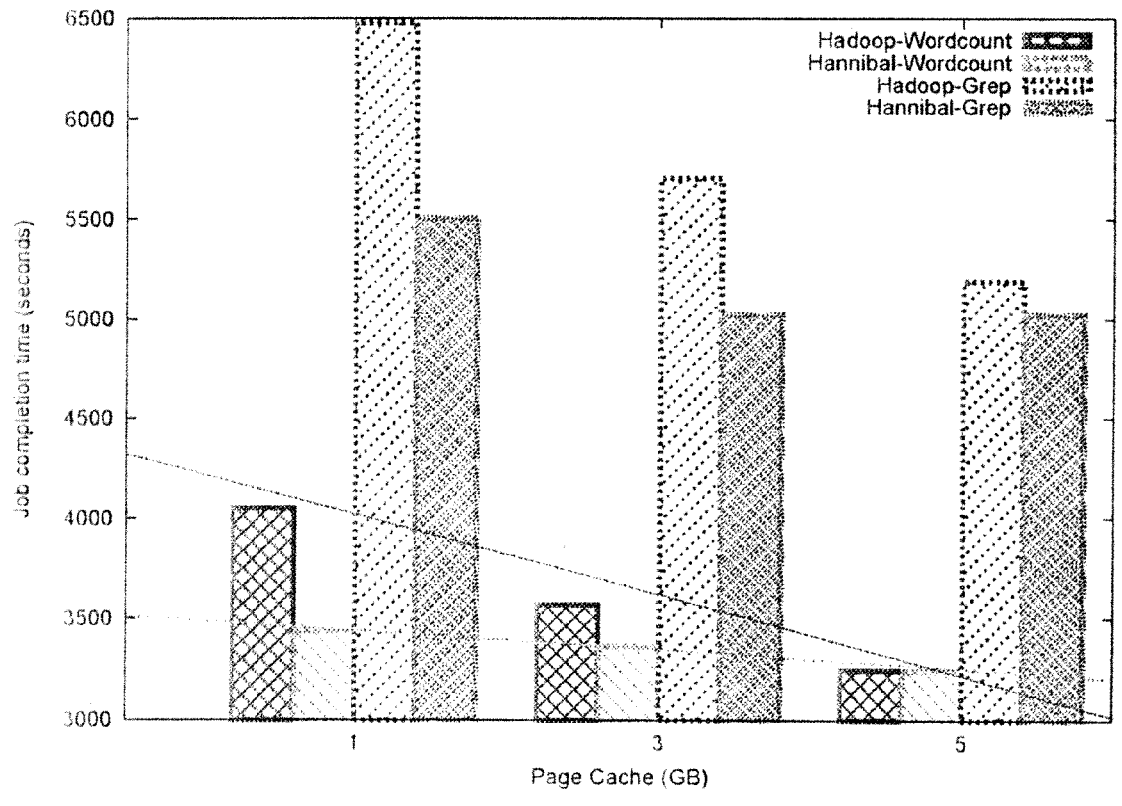
FIG. 8 shows exemplary performance comparisons 800 for Hadoop versus the present invention, based on experiments conduced by the present inventors, using wordcount and grep.

1) End to End Performance: We first investigate the end-to-end performance when the workloads are executed in Hannibal and in plain Hadoop under various disk cache sizes. FIG. 8 plots the results of this evaluation for wordcount and grep. The X and Y axes corresponds to the available disk cache in GB (this value is rounded for the purpose of simplicity) and the end-to-end completion time in seconds, respectively. As our results show, both wordcount and grep exhibit an increase in Hadoop completion time of up to 24.2% and 25.1% when the size of the disk cache is 1 GB. Under Hannibal and the same disk cache the performance degradation is 5.85% and 8.8%, respectively.

Note that at 5 GB, shown by label 810, Hannibal and plain Hadoop perform similarly. The intuition behind this is that when disk cache is not stressed, the IMDG in Hannibal emulates the behaviour of the disk cache in plain Hadoop. Furthermore, this result also shows that Hannibal does not incur in any overhead for storing objects in the IMDG as compared to the sequential write access to disk in plain Hadoop. This signifies the usefulness of Hannibal as a system for storing large-scale intermediate data in clusters with large amount of memory.

Figure 9:
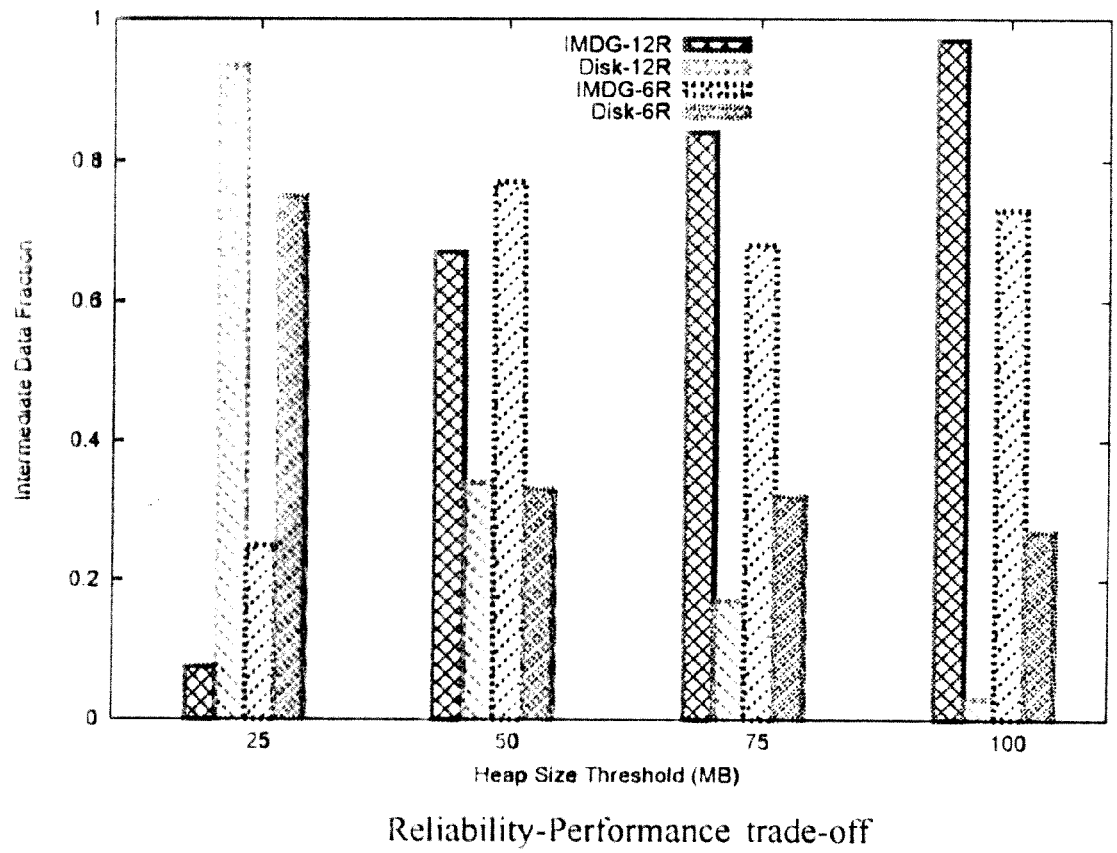
FIG. 9 shows exemplary reliability-performance tradeoffs 900 in which can be seen ratios of intermediate data that is stored to disk and to IMDG under different values of HeapThreshold.

2) Intermediate Data Fraction: FIG. 9 shows the ratio of intermediate data that is stored to disk and to IMDG under different values of HeapThreshold and number of reduce tasks for our experiment. As expected, the amount of intermediate data that is stored in IMDG increases with larger values of HeapThreshold. Furthermore, the sensitivity of this ratio to the value of HeapThreshold is significant; note the crossing point of the disk and IMDG ratios for the case in where there are 12 reduce tasks. We investigate further the role of HeapThreshold in the next experiment.

3) Selecting HeapThreshold: The value of HeapThreshold is crucial to better utilize memory in Hannibal. On one hand a small value results in a behaviour that is equivalent to plain Hadoop since all the intermediate data is stored into disk. On the other hand, a large value may result in overcommitting memory as IMDG containers can potentially grow to a heap size of HeapThreshold and exacerbate the existing memory constraint condition that Hannibal seeks to alleviate. To assess our intuition, we take the measurement of the heap size of the IMDG container after each garbage collection (GC) along with its corresponding timestamp. We slice the timestamps into 50-second windows and average the heap size measurements for all the GCs that completed during each window.

Figure 10:
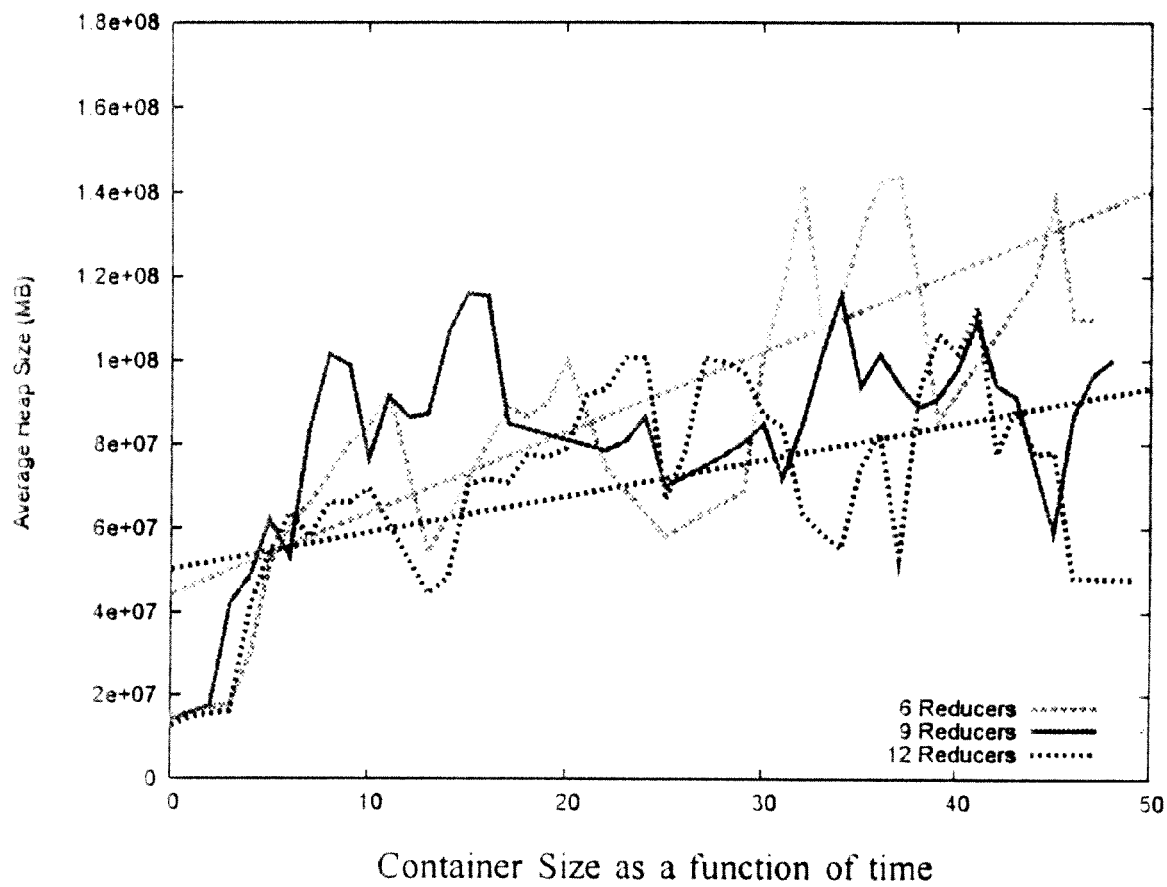
FIG. 10 shows an exemplary function 1000 of container size versus time.

In FIG. 10 we plot these values for one of the IMDG containers in our Hadoop cluster running the three jobs with HeapThreshold equal to 200 MB for different number of reduce tasks. Multiple observations can be made regarding these results. First, as the number of reduce tasks decreases, the garbage collector struggles to keep the container size under HeapThreshold. Second, as the number of reduce tasks increases there are more GCs.

We observe that for one container the number of GCs is 433 and 662 for the case of 6 and 12 reduce tasks, respectively. This follows intuition since there is a larger number of objects (spills) to be retrieved and collected. Also, there is a higher number of consumers (reducers) being served by the IMDG containers concurrently.

This experiment also gives some interesting insights on the amount of memory needed by Hannibal to maintain a steady flow between the map and reduce phase in memory. It is noticeable that for our benchmarks the amount of memory needed is very small (less than 200 MB). This is an effect of the configuration of the MapReduce job; more specifically, the number of map and reduce tasks. Thus, the amount of memory required by Hannibal to mitigate the congestion of the disk cache increases with a poor configuration of MapReduce jobs. Nevertheless, even with a poorly configured job, Hannibal will never do worse than plain Hadoop.

Comparisons with Other Methods

The work that would seem most relevant to Hannibal, to date, is the one presented in Condie, et al., "Mapreduce online". In this work, the authors proposed a modified version of Hadoop Mapreduce that supports online aggregation. This is achieved by pipelining the intermediate data directly between processes.

Hannibal, in contrast, was not designed to support online aggregation. Also, Hannibal decouples the management of intermediate data from the compute layer, by having the data management layer handle the streaming of the data.

The article by Ko, et al., "On Availability of Intermediate Data in Cloud Computations", supports our vision that better abstractions need to be developed to manage intermediate data more efficiently. However, its focus is on providing availability of intermediate data with minimum overhead. We consider the techniques proposed in the Ko article to be applicable to Hannibal for addressing the reliability trade-off.

Exemplary Hardware Implementation

Figure 11:
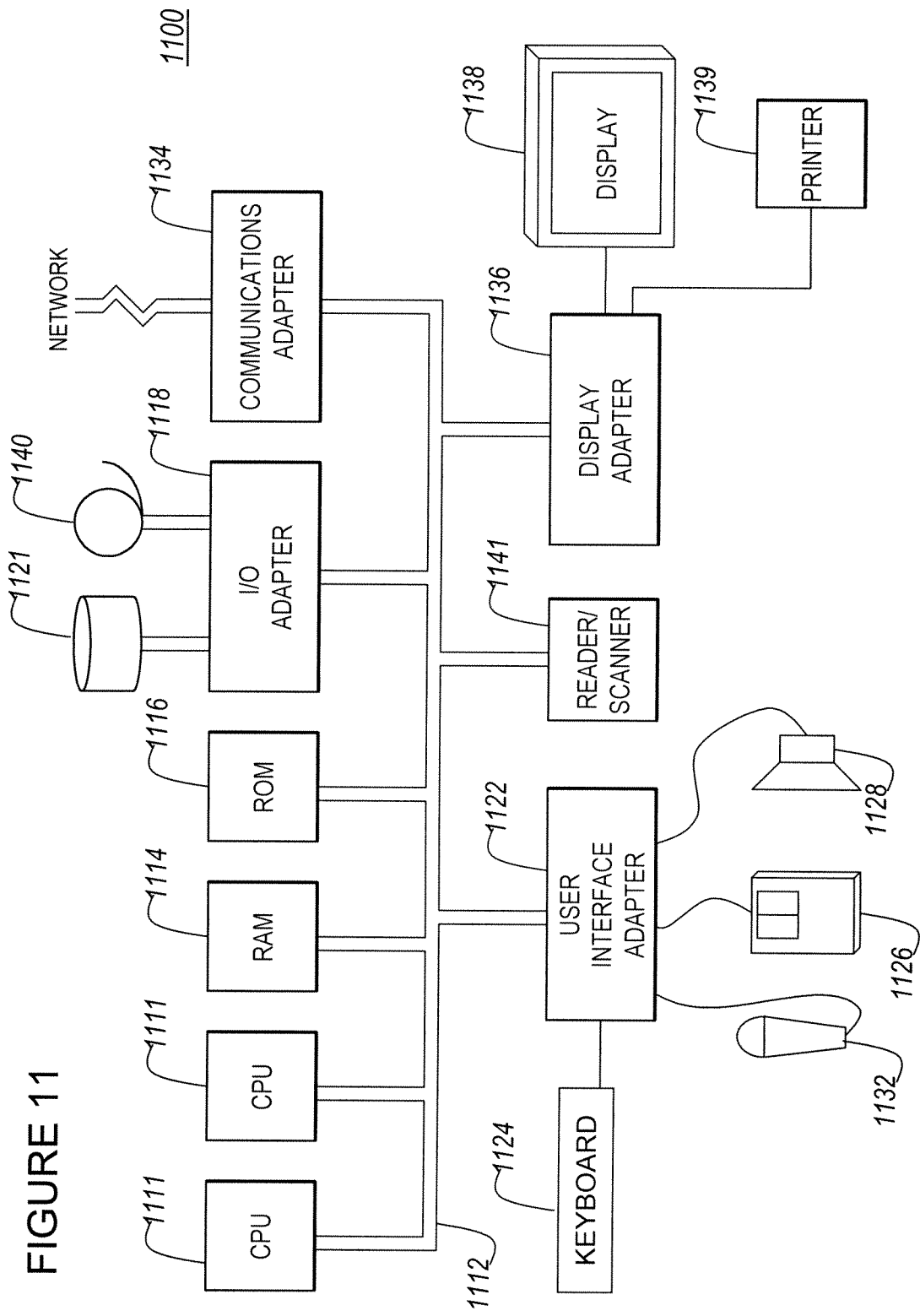
FIG. 11 illustrates an exemplary hardware 1100 for incorporating the present invention therein.
Figure 12:
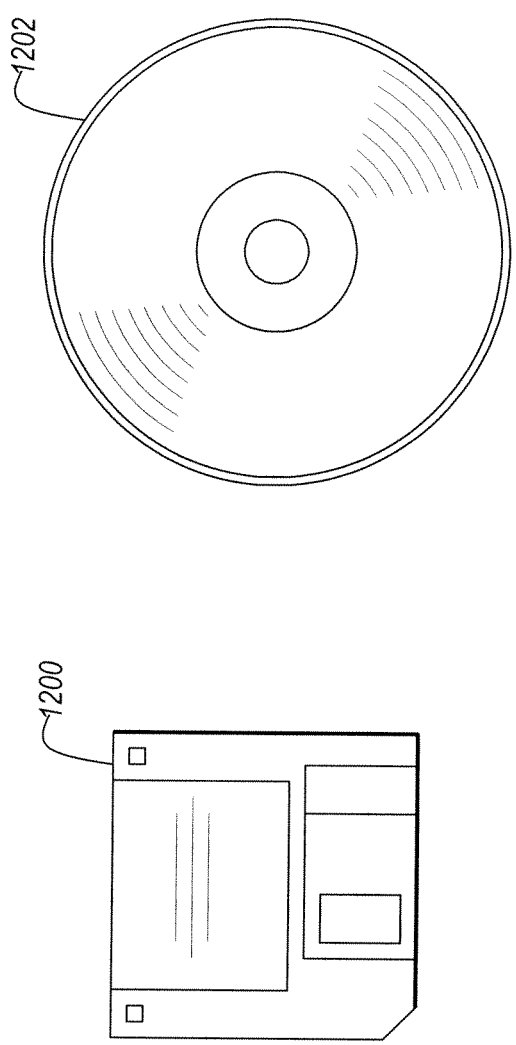
FIG. 12 illustrates a signal bearing medium 1200 (e.g., storage medium) for storing steps of a program of a method according to the present invention.

FIG. 11 illustrates a typical hardware configuration of an information handling/computer system in accordance with the invention and which preferably has at least one processor or central processing unit (CPU) 1111.

The CPUs 1111 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1111 and hardware above, to perform the method of the invention. The descriptive "signal-bearing" means that instructions are tangibly embedded in the storage medium such that signals can be derived by a device that can read data from the storage medium.

This signal-bearing storage media may include, for example, a RAM contained within the CPU 1111, as represented by the fast-access storage for example. Alternatively, the instructions may be contained in another signal-bearing storage media, such as a magnetic or optical data storage diskette 1200, 1202 (FIG. 12), directly or indirectly accessible by the CPU 1111.

Whether contained in the diskette 1200, 1202, the computer/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media including storage devices in transmission media such as communication links and wireless, using either analog or digital formats. In an illustrative embodiment of the invention, the machine-readable instructions may comprise software object code.

Conclusion

Herein was described how the present inventors discovered that certain jobs are more sensitive to disk cache size than others in MapReduce jobs and that this sensitivity is mostly due to file I/O for the intermediate data. Through their experimental assessment, they have also designed and developed Hannibal, a novel memory management framework built on top of Hadoop, to address the performance degradation resulting from insufficient disk cache allocation.

Hannibal effectively isolates the intermediate data from the negative effects of an overstressed disk cache by maintaining the intermediate data in application-level memory. This memory management framework has been implemented and deployed on a real testbed and shown through experimental evaluation that it can make MapReduce jobs run faster than plain Hadoop with little performance insulation between concurrent jobs. Their results also provide insightful observations that suggest that memory provisioning for data analytic platforms requires a better understanding of how disk access pattern and memory interplays with I/O performance of workloads. Without any consideration of the disk access pattern, memory allocation of the disk cache remains a by-product of the efforts of administrators to fit applications in main memory and avoid thrashing.

While the invention has been described in terms of a single exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. An apparatus, comprising:
   at least one processor for executing a processing of an application program;
   a main memory, comprising:
      an in-memory cache structure for normally temporarily storing data produced in said processing; and
      an in-memory storage structure outside said in-memory cache structure, for by-passing said in-memory cache structure for temporarily storing data under a predetermined condition;
   a sensor for detecting an amount of usage of said in-memory cache structure used to store data during said processing; and
   a controller for, upon a detection by said sensor that said amount of usage exceeds a predetermined threshold, controlling said processing so that said data produced in said processing is stored in said in-memory storage structure rather than in said in-memory cache structure.

2. The apparatus of claim 1, wherein the processing comprises a data intensive computing application and said data comprises intermediate data of said data intensive computing application.

3. The apparatus of claim 1, wherein said sensor and said controller are implemented and executed by middleware software operating on said processor, said middleware software comprising a level of software between an operating system on said processor and said application program.

4. The apparatus of claim 1, wherein said memory comprises a random access memory (RAM), said in-memory cache structure comprises a disk cache in said RAM, and said in-memory storage structure comprises an in-memory data grid (IMDG).

5. The apparatus of claim 4, wherein said processing comprises a middleware processing that allows programmers to use a functional programming style to create a map function that processes a key-value pair associated with input data to generate a set of intermediate key-value pairs and a reduce function that merges all intermediate values associated with a same intermediate key.

6. The apparatus of claim 5, wherein said middleware processing comprises an open-source implementation.

7. The apparatus of claim 6, wherein:
   said implementation comprises a TaskTracker control function,
   said sensor comprises a disk cache sensor (DCS) that monitors an available size of said disk cache, and
   said controller comprises:
      a Hannibal Actuator (HA) that interacts with said TaskTracker to work in a hybrid mode wherein intermediate data is stored in said IMDG; and
      a Hannibal Controller (HC) having a function that, when said DCS reports insufficient disk cache, sets a maximum amount of memory that can be used to store intermediate data, and a function that interfaces with said HA to enter into said hybrid mode, and wherein said DCS, said HA, and said HC are implemented as classes in said TaskTracker.

8. The apparatus of claim 4, wherein said IMDG provides a key-value store organized into tables stored in a partitioned manner, and available functions of the IMDG comprise functions to:
   create a table;
   destroy a table;
   store a given value under a given key in a given table; and
   retrieve a value (if any) most recently stored under a given key in a given table.

9. The apparatus of claim 4, wherein said IMDG comprises a controlled IMDG wherein is provided control over where tables are placed.

10. The apparatus of claim 1, as comprising a node in a cluster of nodes, each said node respectively executing in parallel said processing of said application program.

11. A method of processing an application program on a computer, said method comprising:
   providing, in a memory of said computer executing said application, an in-memory cache structure for normally temporarily storing data produced in said processing;
   providing, in said memory, an in-memory storage outside said in-memory cache structure, for by-passing said in-memory cache structure for temporarily storing data under a predetermined condition;
   providing a sensor for detecting an amount of usage of said in-memory cache structure used to store data during said processing;
   detecting that said amount of usage exceeds a predetermined threshold; and
   controlling said processing so that said data produced in said processing is stored in said in-memory storage rather than in said in-memory cache structure.

12. The method of claim 11, wherein the processing comprises a data intensive computing application and said data comprises intermediate data of said data intensive computing application.

13. The method of claim 11, as executed by middleware software operating on said computer, said middleware comprising a level of software between an operating system on said computer and said application program.

14. The method of claim 11, wherein said memory comprises a random access memory (RAM), said in-memory cache structure comprises a disk cache in said RAM, and said in-memory storage structure comprises an in-memory data grid (IMDG).

15. The method of claim 14, wherein said processing comprises a middleware processing that allows programmers to use a functional programming style to create a map function that processes a key-value pair associated with input data to generate a set of intermediate key-value pairs and a reduce function that merges all intermediate values associated with a same intermediate key.

16. A non-transitory, machine-readable storage medium tangibly embodying a series of machine-readable instructions for causing a processor to execute a method of processing an application program on a computer, said method comprising:
   providing a sensor for detecting an amount of usage of an in-memory cache structure, for normally temporarily storing data produced in said processing, used to store data during said processing;
   detecting that said amount of usage exceeds a predetermined threshold; and
   controlling said processing so that said data produced in said processing is stored in an in-memory storage outside said in-memory cache structure, for by-passing said in-memory cache structure for temporarily storing data under a predetermined condition, rather than in said in-memory cache structure.

17. The storage medium of claim 16, as comprising one of:
   a ROM memory on a computer, said ROM memory storing said instructions in preparation for executing said processing;
   a RAM memory on a computer, said RAM memory storing said instructions as being currently being executed by a processor on said computer;
   a stand-alone storage medium that can be inserted into a drive of a computer for downloading said instructions onto said computer; and
   a memory in a server on a network, said server thereby capable of selectively downloading said instructions onto a computer on said network.

18. A set of machine-readable instructions, as tangibly embodied on a non-transitory, machine-readable storage medium, for executing a data intensive computing application, said instructions comprising:
   a sensor for detecting an amount of usage of an in-memory cache structure, for normally temporarily storing data produced in said processing used to store data during a processing of said data intensive computing application; and
   a controller having a function that, upon a detection that said amount of usage exceeds a predetermined threshold, said processing is controlled so that said data produced in said processing is stored in an in-memory storage outside said in-memory cache structure, for by-passing said in-memory cache structure for temporarily storing data under a predetermined condition, rather than in said in-memory cache structure.

19. The set of machine-readable instructions of claim 18, wherein said in-memory cache structure comprises a disk cache in a RAM (random access memory), and said in-memory storage structure comprises an in-memory data grid (IMDG) in said RAM, and said set of instructions are implemented to operate as a middleware software hierarchy on a computer executing said data intensive computing application.

20. The set of machine-readable instructions of claim 19, wherein:
   said data intensive computing application comprises a middleware module executable on said computer, said middleware module including a TaskTracker control function;
   said sensor comprises a disk cache sensor (DCS) that monitors an available size of said disk cache, and
   said controller comprises:
      a Hannibal Actuator (HA) that interacts with said TaskTracker to work in a hybrid mode wherein intermediate data is stored in said IMDG; and
      a Hannibal Controller (HC) having a function that, when said DCS reports insufficient disk cache, sets a maximum amount of memory that can be used to store intermediate data, and a function that interfaces with said HA to enter into said hybrid mode, and
   wherein said DCS, said HA, and said HC are implemented as classes in said TaskTracker control function.

* * * * *